(12) United States Patent
Someya

(10) Patent No.: US 7,643,380 B2
(45) Date of Patent: Jan. 5, 2010

(54) RECEIVING CIRCUIT AND TIME PIECE

(75) Inventor: Kaoru Someya, Kiyose (JP)

(73) Assignee: Casio Computer Co., Ltd., Tokyo (JP)

( * ) Notice: Subject to any disclaimer, the term of this patent is extended or adjusted under 35 U.S.C. 154(b) by 191 days.

(21) Appl. No.: 11/880,636

(22) Filed: Jul. 23, 2007

(65) Prior Publication Data
US 2008/0025155 A1  Jan. 31, 2008

(30) Foreign Application Priority Data
Jul. 26, 2006  (JP) ............................... 2006-202944

(51) Int. Cl.
*G04C 11/02* (2006.01)
*H04B 17/02* (2006.01)
(52) U.S. Cl. .................... 368/47; 455/131; 455/181.1; 455/186.1
(58) Field of Classification Search .................. 368/47; 455/131, 181.1, 186.1
See application file for complete search history.

(56) References Cited
U.S. PATENT DOCUMENTS

| | | | | |
|---|---|---|---|---|
| 4,315,332 | A * | 2/1982 | Sakami et al. | 455/181.1 |
| 5,909,644 | A * | 6/1999 | Tomiyama | 455/146 |
| 6,751,163 | B1 * | 6/2004 | Miyakawa | 368/46 |
| 7,383,031 | B2 * | 6/2008 | Sasaki | 455/131 |
| 2006/0105703 | A1 * | 5/2006 | Takizawa et al. | 455/3.01 |

FOREIGN PATENT DOCUMENTS
JP  2004-80073 A  3/2004
JP  2004-88341 A  3/2004

* cited by examiner

*Primary Examiner*—Felix O Figueroa
*Assistant Examiner*—Thanh S Phan
(74) *Attorney, Agent, or Firm*—Frishauf, Holtz, Goodman & Chick, P.C.

(57) ABSTRACT

A receiving circuit is provided with an amplifier circuit for amplifying the electric signal received by an antenna circuit, a frequency converter/detector circuit for converting a frequency of the electric signal amplified by the amplifier circuit to acquire an intermediate frequency signal, and for detecting the intermediate frequency signal to acquire a demodulated signal, and a filter circuit for removing an intermediate frequency component from the demodulated signal acquired by the frequency converter/detector circuit. Further, the frequency converter/detector circuit is provided with a local oscillation circuit for generating an oscillation signal, plural mixer circuits each for mixing the electric signal amplified by the amplifier circuit with the oscillation signal generated by the local oscillation circuit, whereby plural intermediate frequency signals are generated, which are shifted in phase from each other, plural detecting circuits for detecting the plural intermediate frequency signals generated by the plural mixer circuits, respectively to output plural demodulated signals, and an adder circuit for combining the plural demodulated signals output respectively from the plural detecting circuits.

11 Claims, 10 Drawing Sheets

RECEIVING CIRCUIT AND TIME PIECE

CROSS-REFERENCE TO RELATED APPLICATIONS

This application is based on and claims the benefit of priority from the prior Japanese Patent Application No. 2006-202944, filed Jul. 26, 2006, the entire contents of which are incorporated herein by reference.

BACKGROUND OF THE INVENTION

1. Field of the Invention

The present invention relates to a receiving circuit and a time piece using the receiving circuit.

2. Description of the Related Art

Recently in some countries, a long-wave standard time electromagnetic wave including a time code is transmitted from a transmitting station. A time piece receives the long-wave standard time electromagnetic wave to acquire the time code and corrects the time using the acquired time code. In Japan, two transmitting stations provide service now to send 40 kHz and 60 kHz long-wave standard time electromagnetic waves respectively. The time code has a frame of 60 seconds per cycle.

In a receiving circuit of a super heterodyne system, an intermediate frequency signal (30 Hz signal) is generated based a received standard time electromagnetic wave signal (40 kHz signal) and the generated intermediate frequency signal is sent to a filter, in which an intermediate frequency component is removed.

FIG. 11 is a view showing an example of a conventional 1; frequency converter/detector circuit and a conventional detector. The standard time electromagnetic wave signal of 40 kHz is amplified by an amplifier 180, and applied to a mixer 182. Meanwhile, the mixer is supplied with an oscillation signal of a local oscillator 181. When an oscillation signal of 39.97 kHz is applied to the mixer 182 from the local oscillator 181, the mixer 182 generates an intermediate frequency signal of 30 Hz. The intermediate frequency signal generated by the mixer 182 is supplied to a band pass filter (BPF) 183, which allows only signal components having frequencies of around 30 Hz to pass through, and amplified by an amplifier 184. The amplified signal is applied to a detector 185. An output signal from the detector 185 is applied to a low pass filter (LPF) 186, whereby an intermediate frequency component is removed from the modulated waveform signal.

JP 2004-80073 A discloses a technique that uses a frequency multiplier circuit to switch a local oscillation signal to be applied to a frequency converter, thereby acquiring an intermediate frequency signal both from a signal of 40 kHz and from a signal of 60 kHz. Further, JP 2004-88341 A discloses a technique that sets a frequency of an oscillation signal of a local oscillator to an intermediate frequency between two frequencies.

As described above with reference to the example shown in FIG. 11, when the intermediate frequency is low enough, for example, when the intermediate frequency is around 30 Hz, the low pass filter having a further lower cut off frequency must be used to decrease the intermediate frequency component of 30 Hz enough to a low level or a high order low pass filter must be used. To adequately integrate the intermediate frequency signal of 30 Hz, a filter having a considerably large time constant must be used. For example, when a filter having the cut off frequency of 5 Hz is used to allow a signal of 5 Hz to pass through, a signal component of 30 Hz is decreased only to degree of 7 dB, and considerable levels of the signal component remains.

Usage of a filter of a low cut off frequency brings a problem that degrades signal quality. Meanwhile, usage of a high order filter brings a problem that a large scale of circuit must be used and the circuit is made more complicated.

SUMMARY OF THE INVENTION

The present invention has an object to provide a receiving circuit including a frequency converter/detector circuit which is simple in circuit configuration and is capable of obtaining a signal to be acquired with improved accuracy, and further to provide a radio wave time piece using such receiving circuit.

According to one aspect of the invention, there is provided a receiving circuit which is provided with an antenna circuit for receiving an electromagnetic wave to acquire an electric signal carried by the electromagnetic wave, an amplifier circuit for amplifying the electric signal acquired by the antenna circuit, a frequency converter/detector circuit for converting a frequency of the electric signal amplified by the amplifier circuit to acquire an intermediate frequency signal, and for detecting the intermediate frequency signal to acquire a demodulated signal, and a filter circuit for removing an intermediate frequency component from the demodulated signal acquired by the frequency converter/detector circuit, wherein the frequency converter/detector circuit is provided with a local oscillation circuit for generating an oscillation signal, plural mixer circuits each for mixing the electric signal amplified by the amplifier circuit with the oscillation signal generated by the local oscillation circuit to generate an intermediate frequency signal, whereby plural intermediate frequency signals are generated, which are shifted in phase from each other, plural detecting circuits for detecting the plural intermediate frequency signals generated by the plural mixer circuits, respectively to output plural demodulated signals, and an adder circuit for combining the plural demodulated signals output respectively from the plural detecting circuits.

According to another aspect of the invention, there is provided a time piece which is provided with an antenna circuit for receiving a standard time electromagnetic wave including time information to acquire an electric signal carried by the standard time electromagnetic wave, an amplifier circuit for amplifying the electric signal acquired by the antenna circuit, a frequency converter/detector circuit for converting a frequency of the electric signal amplified by the amplifier circuit to acquire an intermediate frequency signal, and for detecting the intermediate frequency signal to acquire a demodulated signal, a filter circuit for removing an intermediate frequency component from the demodulated signal acquired by the frequency converter/detector circuit, a time information deriving circuit for deriving time information from the demodulated signal with the intermediate frequency component removed by the filter circuit, a time counting circuit for counting the time, a time displaying device for displaying the time counted by the time counting circuit, and a time correcting circuit for correcting the time counted by the time counting circuit based on the time information derived by the time information deriving circuit, wherein the frequency converter/detector circuit is provided with a local oscillation circuit for generating an oscillation signal, plural mixer circuits each for mixing the electric signal amplified by the amplifier circuit with the oscillation signal generated by the local oscillation circuit to generate an intermediate frequency signal, whereby plural intermediate frequency signals are generated which are shifted in phase from each other, plural detecting circuits for detecting the plural intermediate frequency signals generated by the plural mixer circuits to output plural demodulated signals, and an adder circuit for combining the plural demodulated signals output from the plural detecting circuits.

DETAILED DESCRIPTION OF THE PREFERRED EMBODIMENTS

Circuit Configuration

Figure 1:
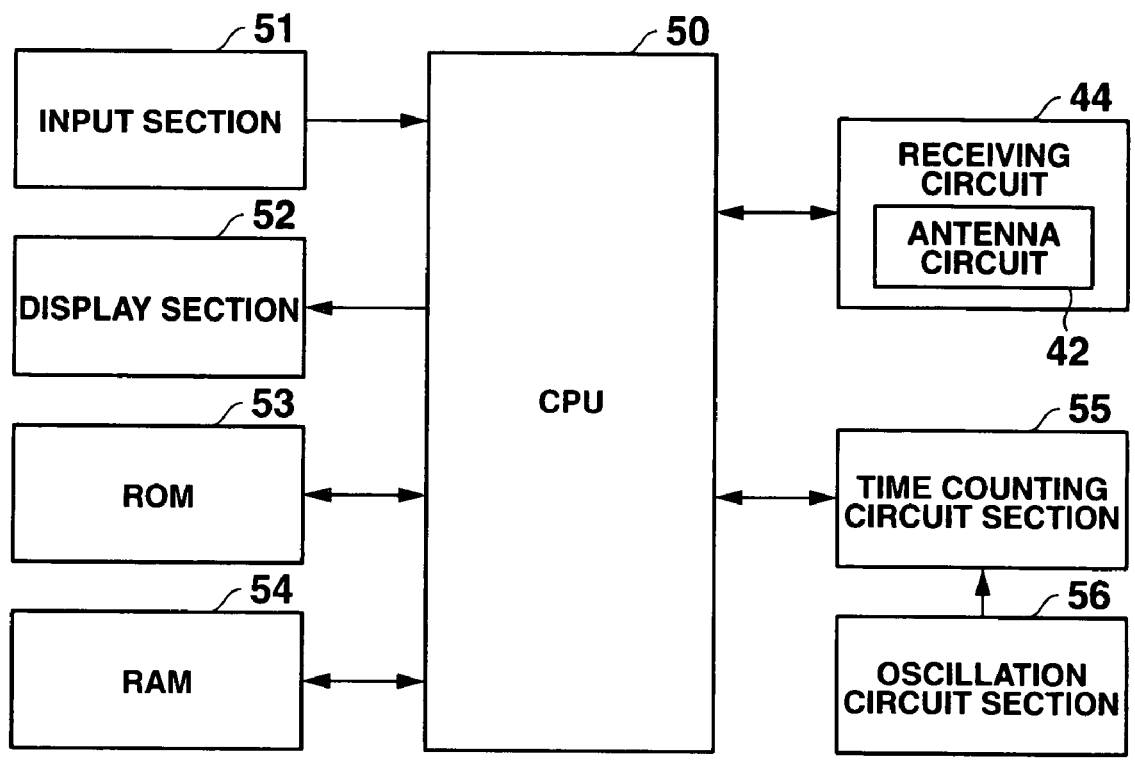
FIG. 1 is a block diagram showing a circuit configuration of a circuit used in a time piece of the present invention.

Now, an embodiment of a timepiece of the present invention will be described with reference to the accompanying drawings. FIG. 1 is a block diagram of a circuit configuration in the embodiment of the timepiece of the invention. As shown in FIG. 1, the timepiece comprises CPU 50, an input section 51, display section 52, ROM 53, RAM 54, receiving circuit 44, time counting circuit section 55, and an oscillation circuit section 56.

CPU 50 reads a program stored on ROM 53, and expands the program on RAM 53 at a given timing or in response to an operation signal input from an input section 200. In accordance with program, CPU 50 sends instructions and data to various sections constituting a wrist watch 1. More specifically, CPU 50 controls the receiving circuit 44 every predetermined time interval to receive a standard time electromagnetic wave, and executes a time correction process to correct current time data counted by the time counting circuit section 55, based on a time code signal supplied from the receiving circuit 44, and further executes a transferring process to transfer to the display section 52 the current time data counted by the time counting circuit section 55.

The input section 51 includes a switch 11 for instructing to implement various functions of the wrist watch 1. When operated, the switch 11 outputs an appropriate operation signal to CPU 50. The display section 52 has a dial plate 23, analog indicating needle mechanism 26 controlled by CPU 50, and a liquid display panel 25. The display section 52 displays the current time counted by the time counting circuit section 55. On ROM 53 are stored a system program for executing predetermined functions, an application program and data. RAM 54 is used as a work area for CPU 50 to temporarily store the program and data read from ROM 53 and processed data.

The receiving circuit 44 has an antenna circuit 42. The receiving circuit 44 acquires a signal of a predetermined frequency from a signal received by the antenna circuit 42, and outputs the acquired signal to CPU 50. The time counting circuit section 55 counts signals input from the oscillation circuit section 56, thereby acquiring the current time data, and outputs the current time data to CPU 50. The oscillation circuit section 56 outputs a clock signal of a constant frequency at all times.

Figure 2:
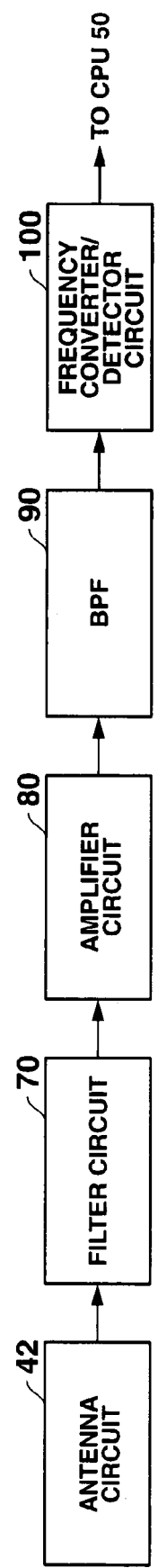
FIG. 2 is a block diagram schematically showing a receiving circuit.

FIG. 2 is a block diagram schematically illustrating the receiving circuit 44 used in the time piece of the invention. As shown in FIG. 2, the receiving circuit 44 comprises the antenna circuit 42, a filter circuit 70, amplifier circuit 80, band pass filter (BPF) 90, and a frequency converter/detector circuit 100. For purposes of illustration and not limitation, a low pass filter is used as the filter circuit 70 (for example, refer to FIG. 5) in the present embodiment of the invention. A band pass filter (BPF) may be used in place of the low pass filter.

Figure 3:
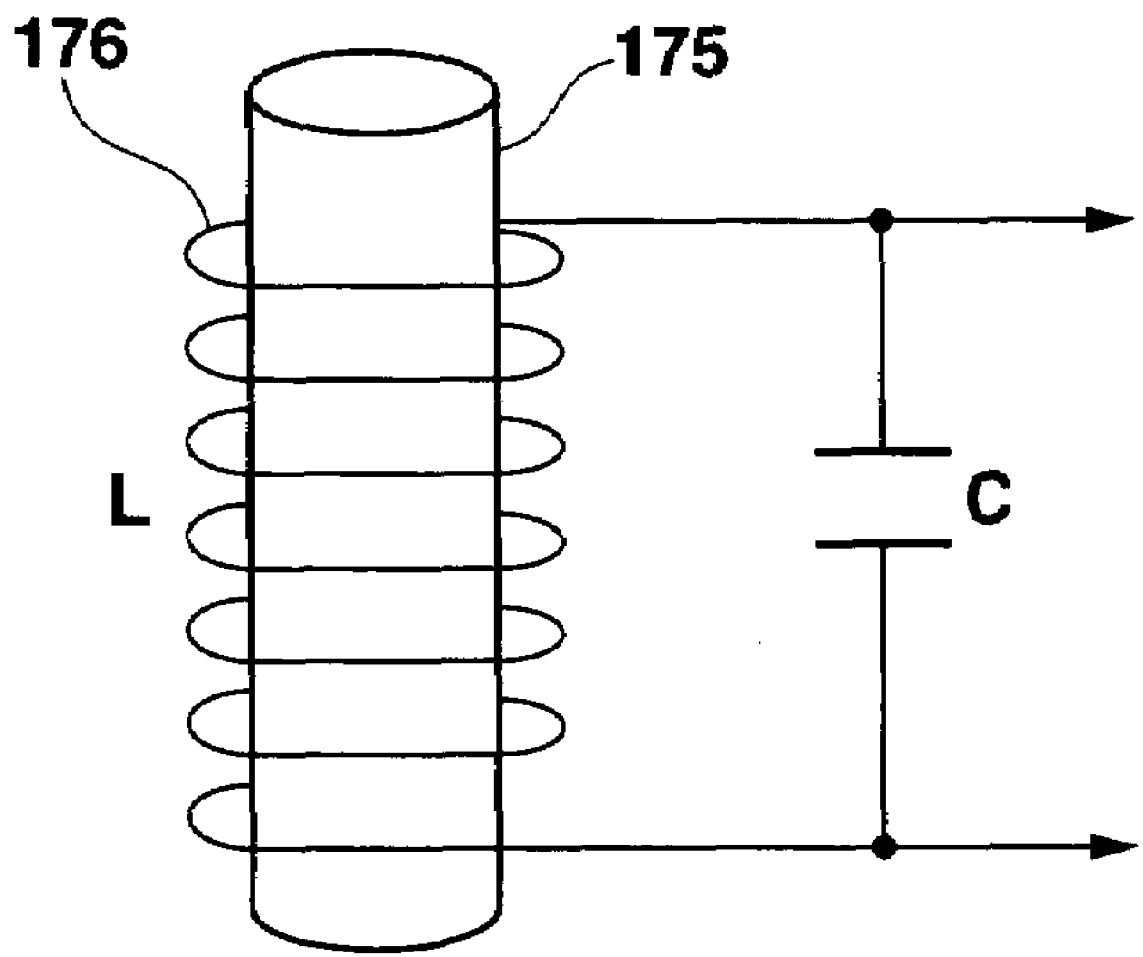
FIG. 3 is a view showing an example of an antenna circuit used in the embodiment of the present invention.

The antenna circuit 42 has a coil L and a capacitor C. The coil L consists of a conducting wire 176 wound around a magnetic body 175, as shown in FIG. 3. The antenna circuit 42 receives the standard time electromagnetic wave and outputs an appropriate signal. The signal output from the antenna circuit 42 is supplied to the frequency converter/detector circuit 100 through the filter circuit 70, amplifier circuit 80, and the band pass filter (BPF) 90.

The frequency converter/detector circuit 100 converts the frequency of the supplied signal, thereby acquiring an intermediate frequency signal. Further, the frequency converter/detector circuit 100 detects the intermediate frequency signal to demodulate a signal of the standard time electromagnetic wave. The demodulated signal is supplied to CPU 50, and CPU 50 decodes the signal, acquiring time information.

Frequency Converter/Detector Circuit

Now, the frequency converter/detector circuit 100 used in the present embodiment of the invention will be described in detail.

Figure 4:
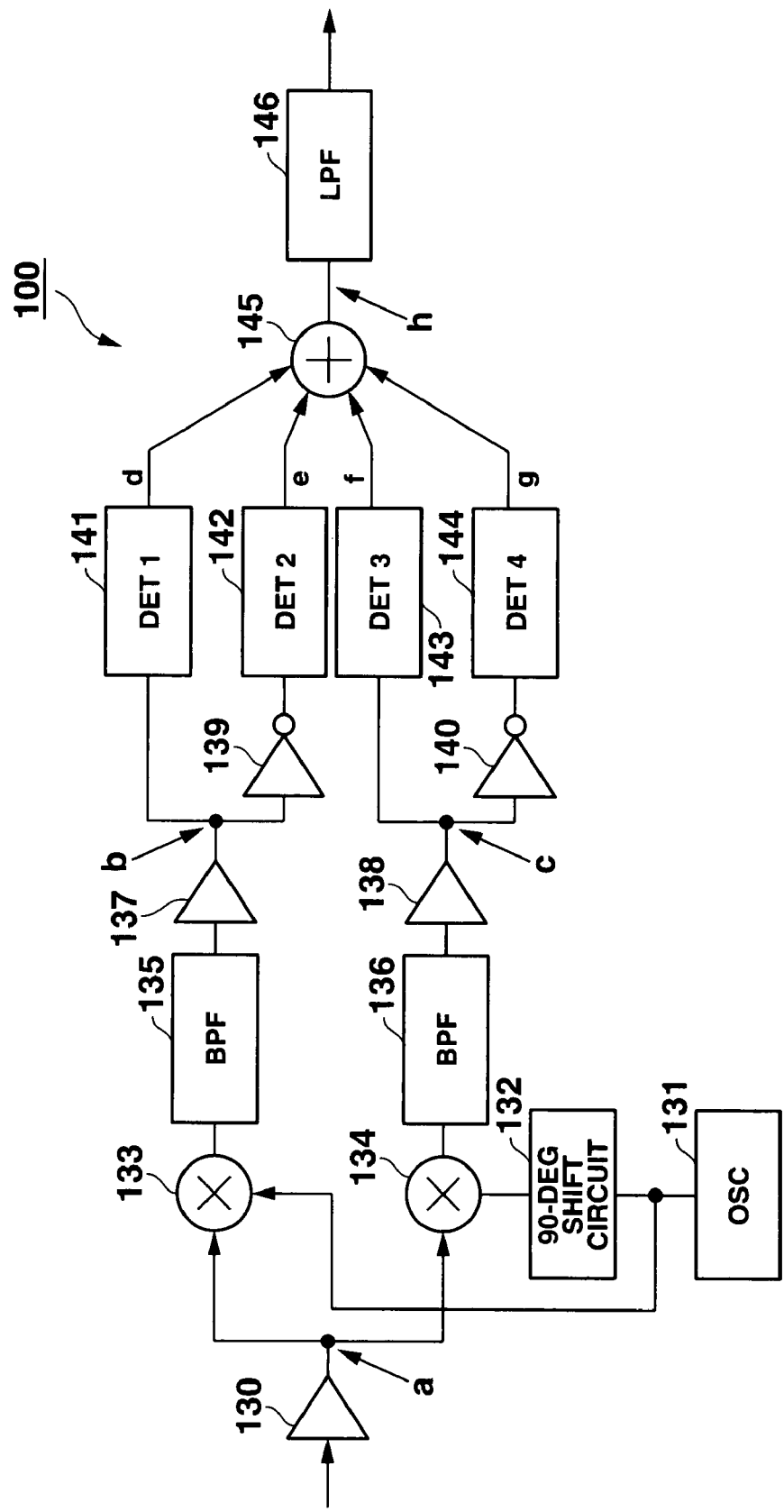
FIG. 4 is a view showing an example of a frequency converter/detector circuit used in the embodiment of the present invention.

FIG. 4 is a view illustrating an example of the frequency converter/detector circuit 100 used in the present embodiment of the invention. As shown in FIG. 4, the frequency converter/detector circuit 100 comprises an amplifier 130, local oscillator 131, 90-deg shift circuit 132, mixers 133, 134, bandpass filters (BPF) 135, 136, amplifiers 137, 138, inverters 139, 140, detectors 141 to 144, adder 145 and a low pass filter (LPF) 146.

The local oscillator 131 generates, for example, a signal of 39.97 KHz (in the case where the transmit frequency of the standard time wave is 40 KHz). The signal of the local oscillator 131 is applied to the mixer 133 and to the 90-deg shift circuit 132. The signal applied to the 90-deg shift circuit 132 is shifted in phase by 90 degrees, and supplied to the other mixer 134.

Receiving the signals from the mixers 133, 134, the band pass filters 135, 136 acquire intermediate frequency signals of 30 Hz, respectively. These signals of 30 Hz are different from each other in phase by 90 degrees, and are used as I signal and Q signal to be subjected to the so-called quadrature detection. The signal output from the band pass filter 135 is amplified by the amplifier 137. The amplified signal is supplied to a first detector (DET 1) 141 and also supplied to a second detector (DET 2) 142 through the inverter 139. Similarly, the signal output from the band pass filter 136 is amplified by the amplifier 138. The amplified signal is supplied to a third detector (DET 3) 143 and also supplied to a fourth detector (DET 4) 144 through the inverter 140.

Four signals output respectively from the detectors 141 to 144 are supplied to the adder 145, wherein these signals are added together. The added signal in the adder 145 is further supplied to the low pass filter 146.

The standard time electromagnetic wave for a radio wave time piece is delayed in data transmission (1 bit per second). Therefore, it is not easy to shorten an integral time constant of the low pass filter, which receives the signals from the detectors. In the present embodiment, intermediate frequency signals are generated by the quadrature detection, which are shifted from each other in phase by 90 degrees, and further these intermediate frequency signals and their respective phase inverted signals are subjected to a detection process and combined together, thereby enhancing integral effect.

Figure 5:
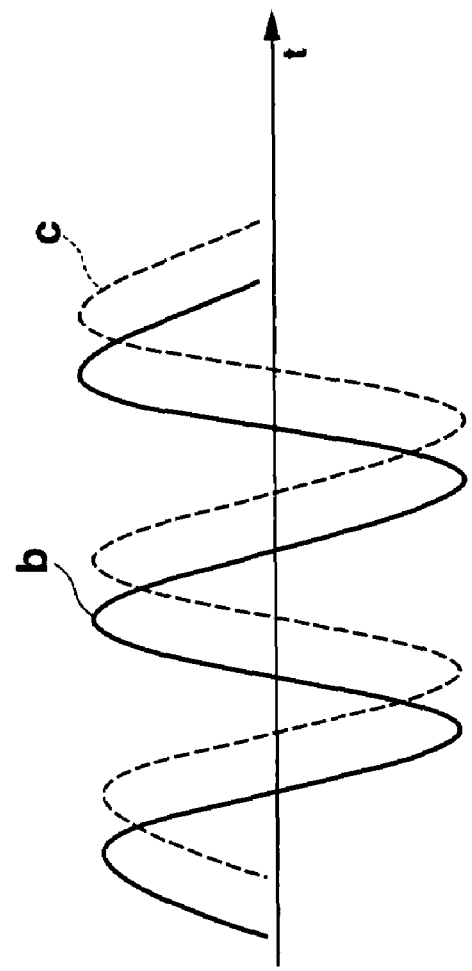
FIG. 5 is a view showing signals appearing at various points in the frequency converter/detector circuit shown in FIG. 4.
Figure 5:
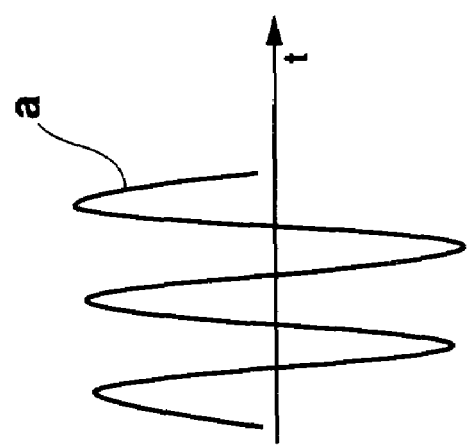

For example, the signal at an point "a" is subjected to the quadrature detection, whereby the signals are acquired at points "b" and "c", which are shifted from each in phase by 90 degrees, as illustrated in FIG. 5. Assuming that the signal at the point "b" is expressed by $\sin \omega t$, the signal at the point "c" will be expressed by $\cos \omega t$, since the signal at the point "c" is shifted in phase by 90 degrees from the signal at the point "b". Assuming that the sum of the signal at the point "d" and the signal at a point "e" is expressed by $|d|+|e|$, and the sum of the signal at a point "f" and the signal at a point "g" is expressed by $|f|+|g|$, then, $|d|+|e|$ and $|f|+|g|$ are given by equations as follows:

$$|d|+|e|=|\sin \omega t|=\tfrac{1}{2}\times\sqrt{(1+\cos 2\omega t)} \quad (2)$$

$$|f|+|g|=|\cos \omega t|=\tfrac{1}{2}\times\sqrt{(1-\cos 2\omega t)} \quad (3)$$

A signal level of the signal output from the adder 145 (the signal at point "h") is expressed by $|d|+|e|+|f|+|g|$. If $|d|+|e|+|f|+|g|=|h|$, then $|h|$ will be given by the following equation.

$$|h|=\tfrac{1}{2}\times[\sqrt{(1+\cos 2\omega t)}+\sqrt{(1-\cos 2\omega t)}] \quad (4)$$

Figure 6:
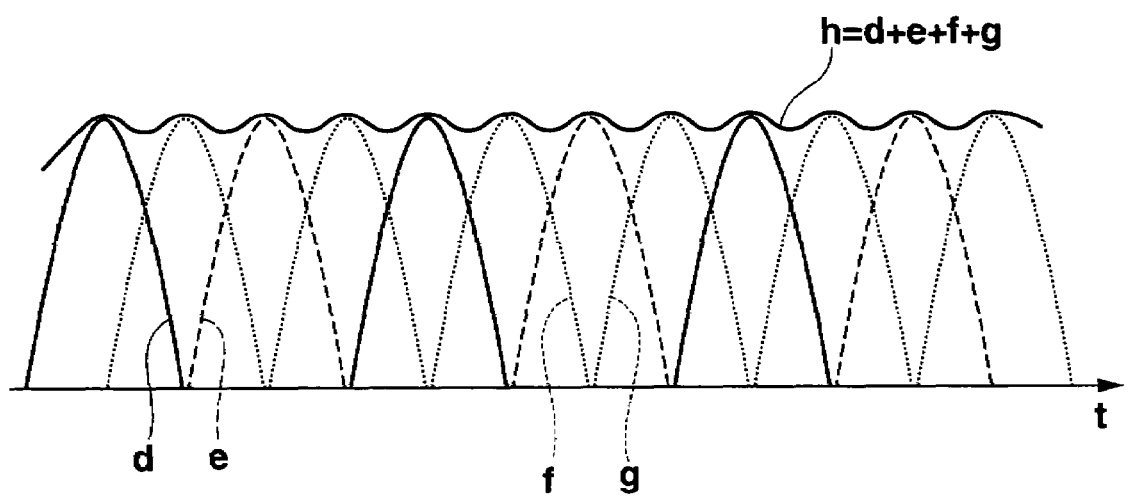
FIG. 6 is a view showing signals appearing at various points in the frequency converter/detector circuit shown in FIG. 4.

The signals at the points "d", "e", "f" and "g" and the combined signal at a point "h" are shown in FIG. 6. In FIG. 6, the signals at the points "d", "e", "f" and "g" are denoted by d, e, f, and g, respectively, and the signal at point "h" is denoted by h. In the expression (4), since the value of the root is "0" or larger, the expression (4) may be expressed as follows:

$$|h| = \sqrt{(h\times h)} \quad (5)$$
$$= \sqrt{[(1/4\times(2+2\times\sqrt{(1-(\cos 2\omega t)^2)}))]}$$
$$= \sqrt{[(1/4\times(2+2\times\sqrt{(1-1/2\times\sqrt{(1-\cos 4\omega t)}))})]}.$$

As expressed by the expression (5), the signal expressed by $|h|$ has a frequency that is four times that of the simply detected signal ($\sin \omega t$, hereinafter, "original signal"). The value of $|h|$ reaches the maximum value of "1", where $\cos 4\omega t=1$, and the value of $|h|$ reaches the minimum value of "$\sqrt{(1/4\times 2+\sqrt{(4-2\sqrt{2})})}$", where $\cos 4\omega t=-1$.

Figure 7:
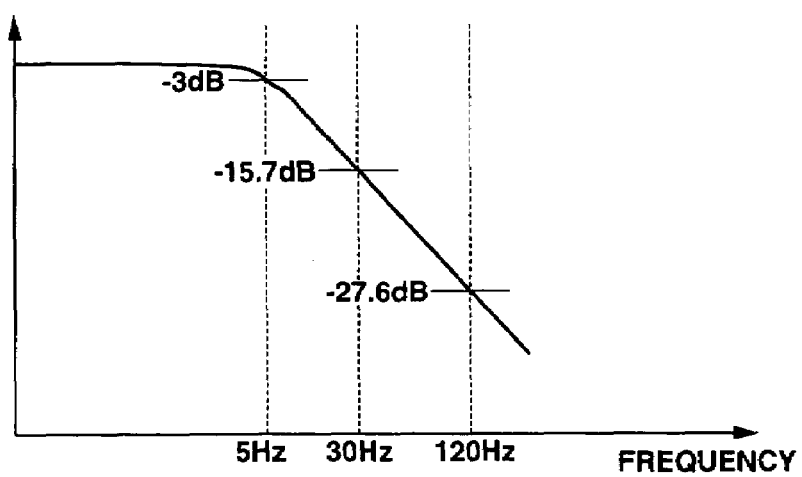
FIG. 7 is a view showing a filtering characteristic of a low pass filter used in the embodiment of the invention.

With respect to the maximum amplitude, the ripple of the signal $|h|$ is expressed by (the maximum value—the minimum value). In this case, the ripple is $(1-\sqrt{(1/4\times 2+\sqrt{(4-2\sqrt{2})})})$. That is, the ripple is approximately equivalent to "0.122". As described above, it will be appear that the filtering effect of 18.2 dB will be obtained in the frequency converter/detector circuit 100 by combining the signals d, e, f and g output from the detectors 141, 142, 143, and 144. As will be apparent from the expression (5), it can be deemed that the frequency converter/detector circuit 100 generates a signal having a frequency that is four time that of the original signal. Therefore, the filtering effect of a low pass filter including a single stage of "CR" is realized in the present embodiment, as shown in FIG. 7. An attenuation characteristic of the low pass filter is give by the expression of $2/\sqrt{(1+f/f_0)}$, where a frequency is denoted by "f" and the cut off frequency is denoted by "$f_0$".

In the case (1) where the original signal is subjected to a filtering operation at 5 Hz in a conventional detection, the attenuation characteristic will be 15.7 dB. Meanwhile, in the case (2) where the signal combined as in the present embodiment is subjected to a filtering operation of 5 Hz, the attenuation characteristic is −45 dB.

Thanks to the filtering effect of 18.2 dB and the improved filtering characteristic as shown in FIG. 7, a simple filter operating at 5 Hz employed in the present embodiment can realize the attenuation characteristic of −45 dB. If the conventional detection as in the case (1) is used to realize the attenuation characteristic of −45 dB as in the case (2), the cut off frequency $f_0$ must be set to 0.3 Hz for the primary order low pass filter. In this case, it is expected that the signal passing through the low pass filter deteriorates considerably in signal quality. Therefore, to avoid deterioration of the signal, it is necessary to use a high order low pass filter.

In the present embodiment, two intermediate frequency signals (corresponding to I signal and Q signal in the quadrature detection), are acquired, which are shifted in phase from each other, and then I signal and its inverted signal, and Q signal and its inverted signal are subjected to the detection process, and the detected signals are combined together. The ripple of the combined signal is extremely small and it can be deemed that a signal has been generated which has a frequency that is four times that of the original signal. Therefore, according to the present embodiment, unnecessary components of the signal are removed adequately and the necessary signal can be prevented from being deteriorated by using a simple low pass filter.

Another Example of Frequency Converter/Detector Circuit

Figure 8:
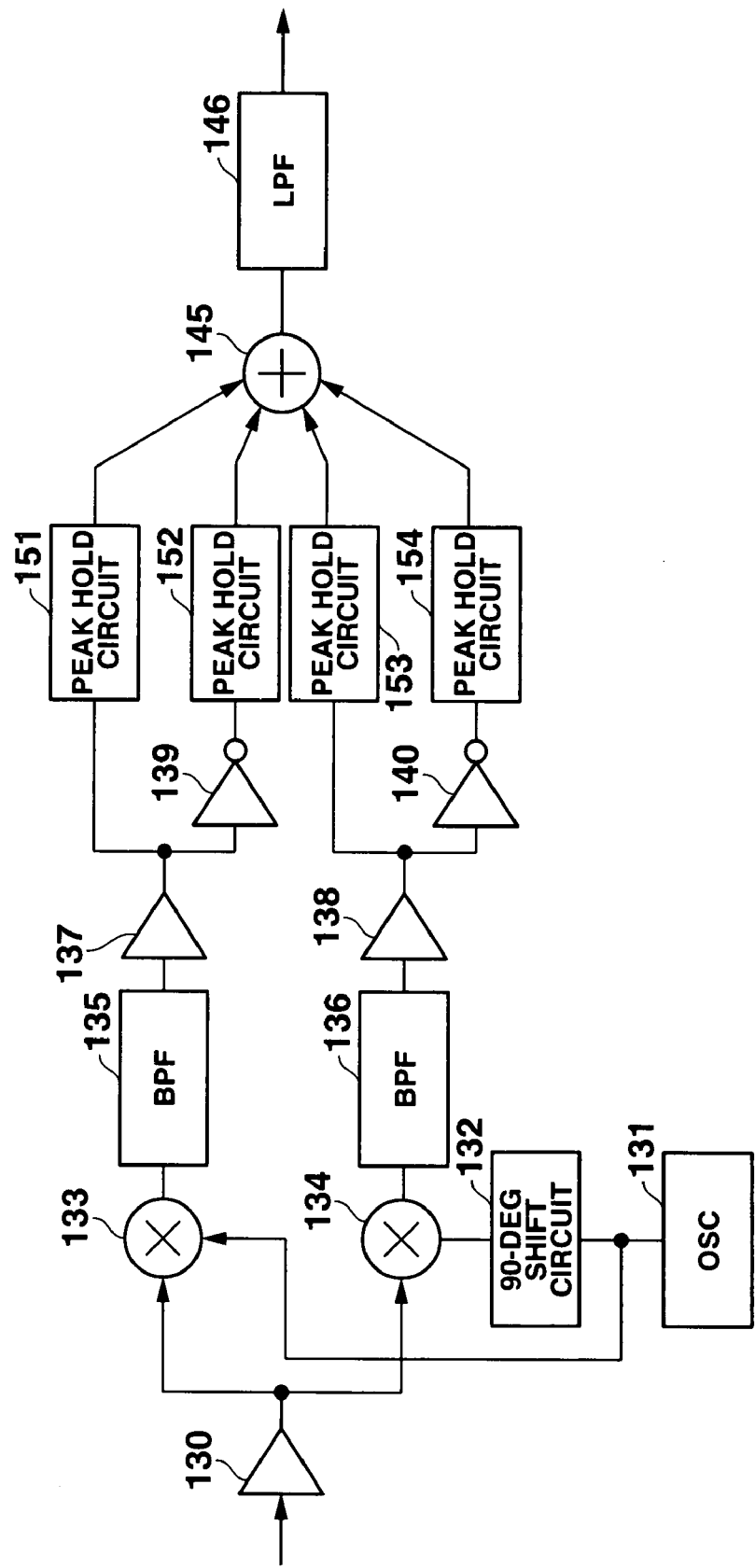
FIG. 8 is a view showing another example of a frequency converter/detector circuit used in embodiment of the present invention.

FIG. 8 is a block diagram illustrating a circuit configuration of another example of the frequency converter/detector circuit used in the embodiment of the time piece according to the present invention. Similarly to the frequency converter/detector circuit 100 shown in FIG. 4, the frequency converter/detector circuit comprises the amplifier 130, local oscillator 131, 90-deg shift circuit 132, mixers 133, 134, band pass filters (BPF) 135, 136, amplifiers 137, 138, inverters 139, 140, adder 145 and the low pass filter (LPF) 146. In the present frequency converter/detector circuit, peak hold circuits 151 to 154 are used in place of the detectors 141 to 144. Detection using the peak hold circuits 151 to 154 produces substantially the same effect as that obtained by the detection using the detectors 141 to 144.

Still Another Example of Frequency Converter/Detector Circuit

Figure 9:
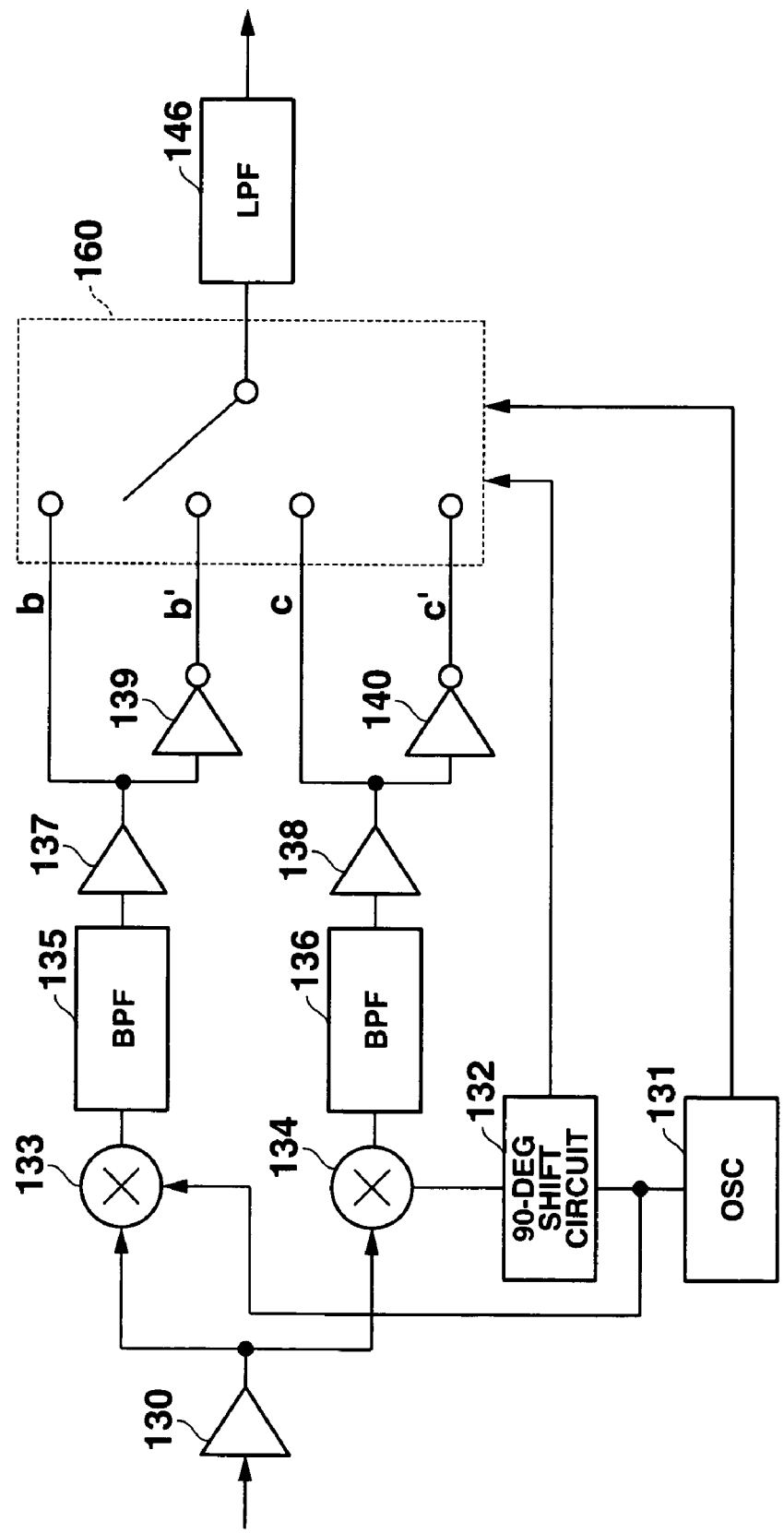
FIG. 9 is a view showing still another example of a frequency converter/detector circuit used in the embodiment of the present invention.

FIG. 9 is a block diagram illustrating a circuit configuration of still another example of the frequency converter/detector circuit used in the embodiment of the time piece of the present invention. In the frequency converter/detector circuit 100 shown in FIG. 4, there are provided detectors 141 to 144 for detecting I signal and its inverted signal, and Q signal and its inverted signal, respectively. Meanwhile, the frequency converter/detector circuit shown in FIG. 9 is provided with a switch circuit 160 for selecting either one of I signal and its inverted signal (inverted I' signal) and Q signal and its inverted signal (inverted Q signal). To the switch circuit 160 are input a signal from the local oscillator 131 and a signal from the 90-deg shift circuit 132.

Figure 10:
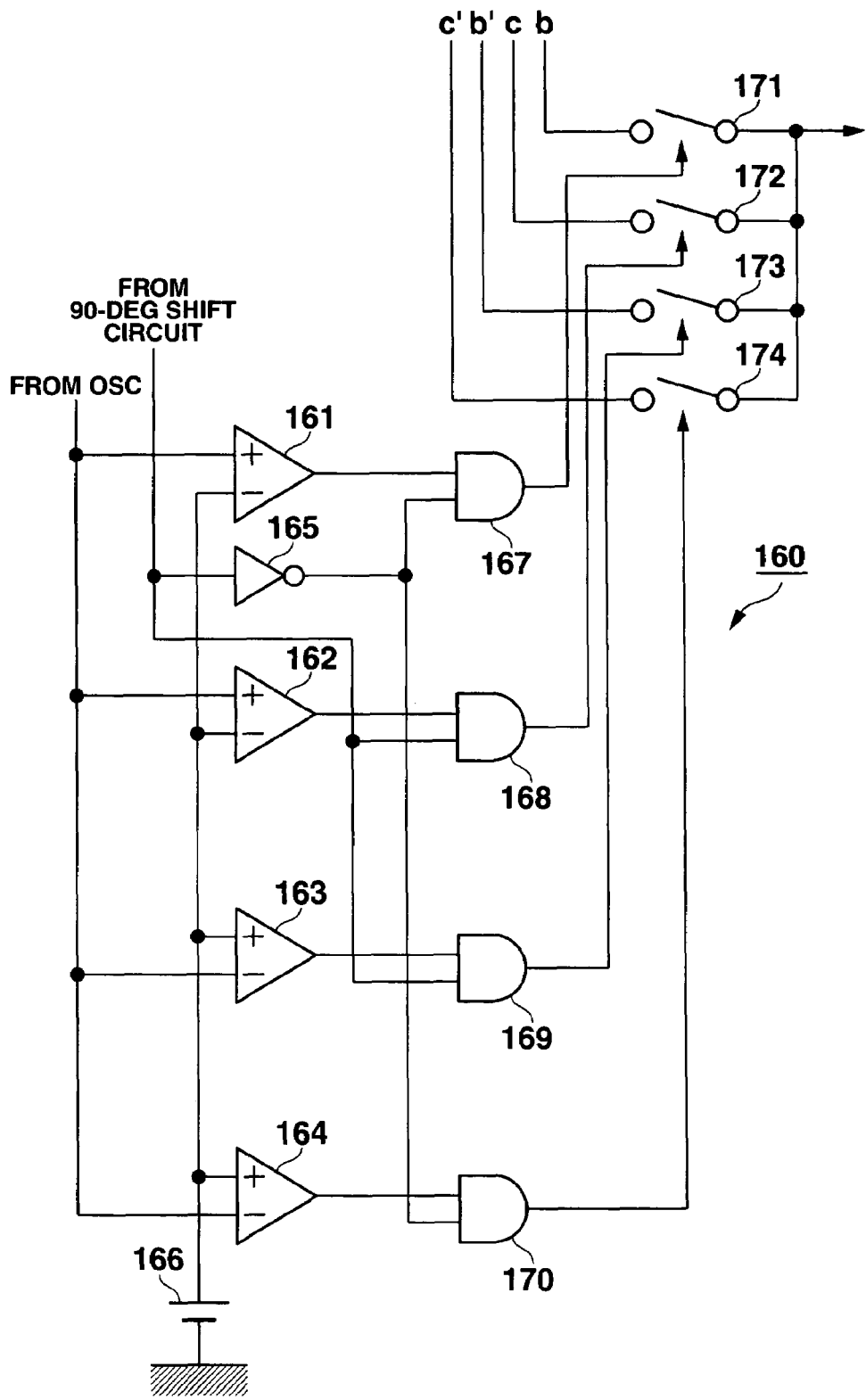
FIG. 10 is a view showing an example of a switch circuit.

FIG. 10 is a view showing the switch circuit 160 in detail. As shown in FIG. 10, the switch circuit 160 has comparators 161 to 164, an inverter 165, a DC power source 166, AND circuits 167 to 170, and switches 171 to 174.

The comparators 161 and 162 are supplied with an oscillation signal from the local oscillator 131 at their (+) terminals and a constant voltage (reference voltage) from the DC power source 166 at their (−) terminals. When supplied with the oscillation signal from the local oscillator 131 that is higher than the reference voltage, the comparators 161, 162 each output a high level output. Meanwhile, the comparators 163 and 164 are supplied with the constant voltage (reference voltage) from the DC power source 166 at their (+) terminals and the oscillation signal from the local oscillator 131 at their (−) terminals. When supplied with the oscillation signal from the local oscillator 131 that is lower than the reference voltage, the comparators 163, 164 each output a high level output.

To one input terminals of AND circuits 167 to 170 are supplied output signals of the comparators 161 to 154, respectively. To the other input terminals of AND circuits 167 and 170 is supplied an output signal of the inverter 165, that is, an inverted oscillation signal of the local oscillator 131, which has been shifted in phase by 90 degrees by the shift circuit 132. Meanwhile, to the other input terminals of AND circuits 168 and 169 is supplied an output signal of the 90-deg shift circuit 132, that is, an oscillation signal of the local oscillator 131, which has been shifted in phase by 90 degrees by the shift circuit 132.

AND circuits 167 to 170 control switching operation of the switches 171 to 174, respectively. When AND circuits 167 to 170 output signals of a high level, respectively, either one of the switches 171 to 174 is made closed.

The switch 171 controls transit of a signal "b" (I signal), and the switch 172 controls transit of a signal "c" (Q signal). Further, the switch 173 controls transit of a signal "b'" (inverted I signal), and the switch 174 controls transit of a signal "c'" (inverted Q signal).

In the switch circuit 160 arranged as described above, for example, when the reference voltage is set to "0" volt, the rising portion of the signal "b" (I signal), the rising portion of the signal "c" (Q signal), the rising portion of the signal "b'" (inverted I signal), and the rising portion of the signal "c'" (inverted Q signal) are selected every 90 degrees by the switches 171 to 174, successively, and the selected rising portion of the signal is output from the switch circuit 160. In this case, the rising portion denotes a part of a curve of sin ωt, where $0 \leq \omega t \leq 90$ deg.

Figure 11:
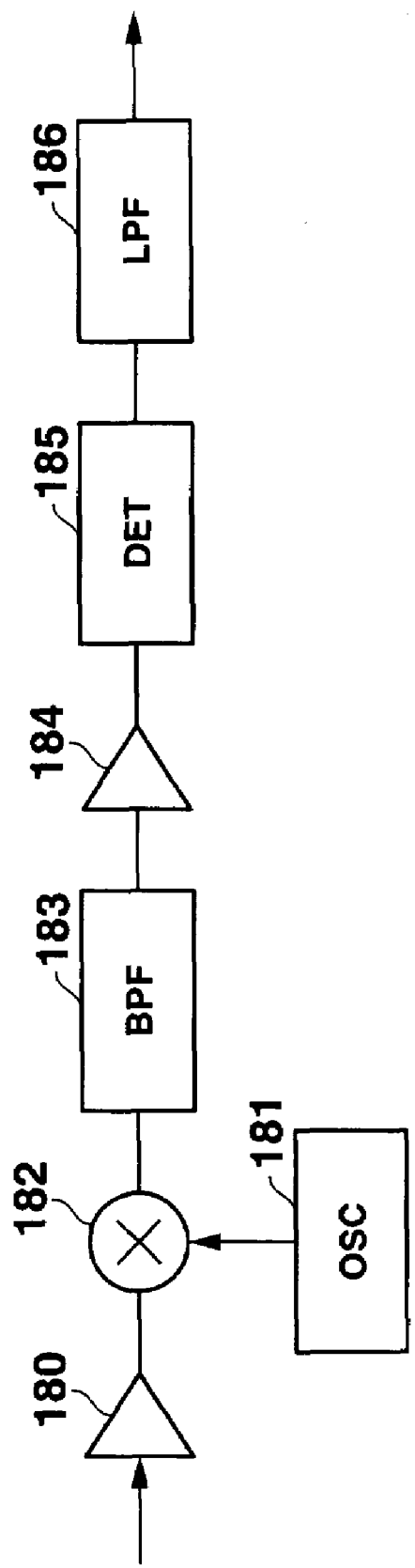
FIG. 11 is a view showing a conventional frequency converter/detector circuit and a conventional detector.

Assuming that the signal "b" is expressed by sin ωt, the switch circuit 160 repeatedly outputs the rising portion of the curve of sin ωt every 90 degrees. As a result, it may be deemed that the output signal of the switch circuit 160 has a frequency that is four times that of the signal "b". As described above, the frequency converter/detector circuit shown in FIG. 10 can produce the same effect as those described referring to FIG. 6 and FIG. 11.

Note that the reference voltage is not always set to 0 volt but may be set an arbitrary level in the switch circuit 160. Further, the switch circuit 160 may be arranged such that when I signal, the inverted I signal, Q signal, or the inverted Q signal reaches the maximum level, the switches select the appropriate signal. But note that the switch circuit 160 is not restricted to that shown in FIG. 10.

In the receiving circuits used in the time piece of the present invention, signals which are shifted in phase from each other, for example, signals shifted by 90 degrees from each other are subjected to a detection process and the detected signals are combined together. The arrangement of the receiving circuit described above allows to use a filter having a comparatively short time constant in the following stage, and the filter of a simple configuration can produce an adequate integral effect in the detected signal and minimize deterioration in a modulated wave form to be acquired.

As described above, the present invention provides the receiving circuit including the frequency converter/detector circuit, which is simple in a circuit configuration and is capable of obtaining a signal to be acquired with improved accuracy, and further provides a radio wave time piece using such receiving circuit.

The scope of the present invention is not restricted to the embodiments described herein, but modifications and variations may be made to the disclosed embodiments while remaining within the scope of the invention as defined by the following claims.

For example, in the embodiments described above, the antenna circuit is used that includes MI magnetic sensor and the high frequency oscillator, but an antenna circuit may be used that includes the capacitor C and the coil L consisting of the wire 176 wound around the magnetic body 175 as shown in FIG. 3.

What is claimed is:

1. A receiving circuit comprising:
   an antenna circuit for receiving an electromagnetic wave to acquire an electric signal carried by the electromagnetic wave;
   an amplifier circuit for amplifying the electric signal acquired by the antenna circuit;
   a frequency converter/detector circuit for converting a frequency of the electric signal amplified by the amplifier circuit to acquire an intermediate frequency signal, and for detecting the intermediate frequency signal to acquire a demodulated signal; and
   a filter circuit for removing an intermediate frequency component from the demodulated signal acquired by the frequency converter/detector circuit, wherein the frequency converter/detector circuit comprises:
   a local oscillation circuit for generating an oscillation signal;
   plural mixer circuits each for mixing the electric signal amplified by the amplifier circuit with the oscillation signal generated by the local oscillation circuit, whereby plural intermediate frequency signals are generated, which are shifted in phase from each other;
   plural detecting circuits for detecting the plural intermediate frequency signals generated by the plural mixer circuits respectively, thereby outputting plural demodulated signals; and
   an adder circuit for combining the plural demodulated signals output respectively from the plural detecting circuits.

2. The receiving circuit according to claim 1, wherein the frequency converter/detector circuit further comprises:
   plural inverter circuits each for inverting the intermediate frequency signal generated by the mixer circuit, wherein the intermediate frequency signals generated by the plural mixer circuits and the inverted intermediate frequency signals by the plural inverter circuits are supplied respectively to the plural detecting circuits to be detected by said plural detecting circuits.

3. The receiving circuit according to claim 1, wherein the detecting circuit of the frequency converter/detector circuit comprises a peak hold circuit.

4. The receiving circuit according to claim 1, wherein the frequency converter/detector circuit further comprises:
a switch circuit for selecting successively either one of the intermediate frequency signals generated respectively by the plural mixer circuits and the inverted intermediate frequency signals respectively by the plural inverter circuits, wherein the switch circuit selects a signal from among the plural intermediate frequency signals and the plural inverted intermediate frequency signals, when the corresponding signal has reached the maximum level.

5. The receiving circuit according to claim 4, wherein the frequency converter/detector circuit further comprises:
a phase shift circuit for shifting a phase of the oscillation signal generated by the local oscillation circuit, wherein the frequency converter/detector circuit controls operation of the switch circuit based on the oscillation signal generated by the local oscillation circuit and the oscillation signal shifted in phase by the phase shift circuit.

6. A time piece comprising:
an antenna circuit for receiving a standard time electromagnetic wave including time information to acquire an electric signal carried by the standard time electromagnetic wave;
an amplifier circuit for amplifying the electric signal acquired by the antenna circuit;
a frequency converter/detector circuit for converting a frequency of the electric signal amplified by the amplifier circuit to acquire an intermediate frequency signal, and for detecting the intermediate frequency signal to acquire a demodulated signal;
a filter circuit for removing an intermediate frequency component from the demodulated signal acquired by the frequency converter/detector circuit;
a time information deriving circuit for deriving time information from the demodulated signal with the intermediate frequency component removed by the filter circuit;
a time counting circuit for counting the time;
a time displaying device for displaying the time counted by the time counting circuit; and
a time correcting circuit for correcting the time counted by the time counting circuit based on the time information derived by the time information deriving circuit, wherein the frequency converter/detector circuit comprises:
a local oscillation circuit for generating an oscillation signal;
plural mixer circuits each for mixing the electric signal amplified by the amplifier circuit with the oscillation signal generated by the local oscillation circuit to generate an intermediate frequency signal, whereby plural intermediate frequency signals are generated which are shifted in phase from each other;
plural detecting circuits for detecting the plural intermediate frequency signals generated by the plural mixer circuits to output plural demodulated signals; and
an adder circuit for combining the plural demodulated signals output from the plural detecting circuits.

7. The time piece according to claim 6, wherein the frequency converter/detector circuit further comprises:
plural inverter circuits each for inverting the intermediate frequency signal generated by the mixer circuit, wherein the intermediate frequency signals generated by the plural mixer circuits and the inverted intermediate frequency signals by the plural inverter circuits are supplied respectively to the plural detecting circuits to be detected by said plural detecting circuits.

8. The time piece according to claim 6, wherein the detecting circuit of the frequency converter/detector circuit comprises a peak hold circuit.

9. The time piece according to claim 6, wherein the frequency converter/detector circuit further comprises:
a switch circuit for selecting successively either one of the intermediate frequency signals generated by the plural mixer circuits and the inverted intermediate frequency signals by the plural inverter circuits, wherein the switch circuit selects a signal from among the plural intermediate frequency signals and the plural inverted intermediate frequency signals, when the corresponding signal has reached the maximum level.

10. The receiving circuit according to claim 9, wherein the frequency converter/detector circuit further comprises:
a phase shift circuit for shifting a phase of the oscillation signal generated by the local oscillation circuit, wherein the frequency converter/detector circuit controls operation of the switch circuit based on the oscillation signal generated by the local oscillation circuit and the oscillation signal shifted in phase by the phase shift circuit.

11. The time piece according to claim 6, wherein the antenna circuit comprises:
magnetic field detecting means which changes its own electronic characteristics in response to changes in a magnetic field;
high frequency signal generating means for generating a high frequency signal to be applied to the magnetic field detecting means; and
detecting means for detecting a signal received by the magnetic field detecting means and the high frequency signal generating means.

* * * * *